(12) United States Patent
Tsai et al.

(10) Patent No.: US 10,095,339 B1
(45) Date of Patent: Oct. 9, 2018

(54) TOUCH PANEL (71) Applicant: HannsTouch Solution Incorporated, Tainan (TW)

(72) Inventors: Ching-Feng Tsai, Tainan (TW); Shi-Wei Ma, Tainan (TW)

(73) Assignee: HannsTouch Solution Incorporated, Tainan (TW)

(*) Notice: Subject to any disclaimer, the term of this patent is extended or adjusted under 35 U.S.C. 154(b) by 0 days.

(21) Appl. No.: 15/640,597

(22) Filed: Jul. 3, 2017

(30) Foreign Application Priority Data

May 12, 2017 (TW) .............................. 106115751 A (51) Int. Cl.
*G06F 3/00* (2006.01)
*G06F 3/041* (2006.01)
*B32B 15/04* (2006.01)

(52) U.S. Cl.
CPC ............ *G06F 3/0412* (2013.01); *B32B 15/04* (2013.01); *B32B 2307/412* (2013.01); *G09G 2300/0426* (2013.01)

(58) Field of Classification Search
CPC . G06F 3/0412; B32B 2307/412; B32B 15/04; G09G 2300/0426
See application file for complete search history.

(56) References Cited

U.S. PATENT DOCUMENTS

| 2014/0110683 A1* | 4/2014 | Huang | G06F 3/041 257/40 |
| 2015/0109238 A1* | 4/2015 | Chen | G06F 3/046 345/174 |
| 2018/0081471 A1* | 3/2018 | Qu | G06F 3/0412 |

* cited by examiner

*Primary Examiner* — Muhammad N Edun
(74) *Attorney, Agent, or Firm* — Winston Hsu (57) ABSTRACT

A touch panel is provided and includes a substrate and a plurality of sensing pads disposed on the substrate. Each sensing pad includes a metal layer, an insulation layer and a transparent conductive layer. The insulation layer is disposed between the metal layer and the transparent conductive layer, and the metal layer is in contact with the transparent conductive layer.

17 Claims, 10 Drawing Sheets

TOUCH PANEL

BACKGROUND OF THE INVENTION

1. Field of the Invention

The present invention relates to a touch panel, and more particularly, to a touch panel including sensing electrodes with insulation layer.

2. Description of the Prior Art

With passage of time, touch panels have become input devices of many kinds of communication home electronics and information products. The touch panel is stacked on a display module for providing a user to directly interact with display frames. In order to transmit signals generated from the touch panel operated by the user, there are a plurality of sensing electrodes disposed in the touch panel, which is used for sensing signal difference when the touch panel is touched. In most of the conventional touch panels, indium tin oxide (ITO) is used to form the sensing electrodes because of having advantages of transparency and high conductivity. However, ITO is easily brittle and has compressive stress so as to have bad ductility. Accordingly, ITO is hard to be applied to a flexible touch panel. Especially, when a bending angle of the touch panel is large, for example the touch panel is folded, ITO is easily broken, which results in abnormal operation of the touch panel.

SUMMARY OF THE INVENTION

It is therefore one of the objectives of the present invention to provide a touch panel to increase its bending ability.

According to an embodiment of the present invention, a touch panel is provided. The touch panel has a transparent region and an opaque region, and the touch panel includes a substrate, a light-shielding layer, a plurality of first sensing electrodes, and a plurality of conducting wires. The light-shielding layer is disposed on the substrate in the opaque region. The first sensing electrodes are disposed on the substrate in the transparent region, and each first sensing electrode includes a first metal layer, a first insulation layer, and a first transparent conductive layer, wherein in each first sensing electrode, the first insulation layer is disposed between the first metal layer and the first transparent conductive layer, and the first metal layer and the first transparent conductive layer are electrically connected to each other. The conducting wires are disposed on the substrate in the opaque region, and each conducting wire is electrically connected to the first sensing electrodes corresponding thereto respectively.

In the touch panel of the present invention, because the bending ability of the stack of the first transparent conductive layer, the first insulation layer and the first metal layer can be improved by disposing the first insulation layer with tensile stress between the first transparent conductive layer and the first metal layer, the bending ability of the sensing electrodes, the connecting segments and/or the conducting wires utilizing the stack can be increased, thereby improving the bending reliability of the touch panel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
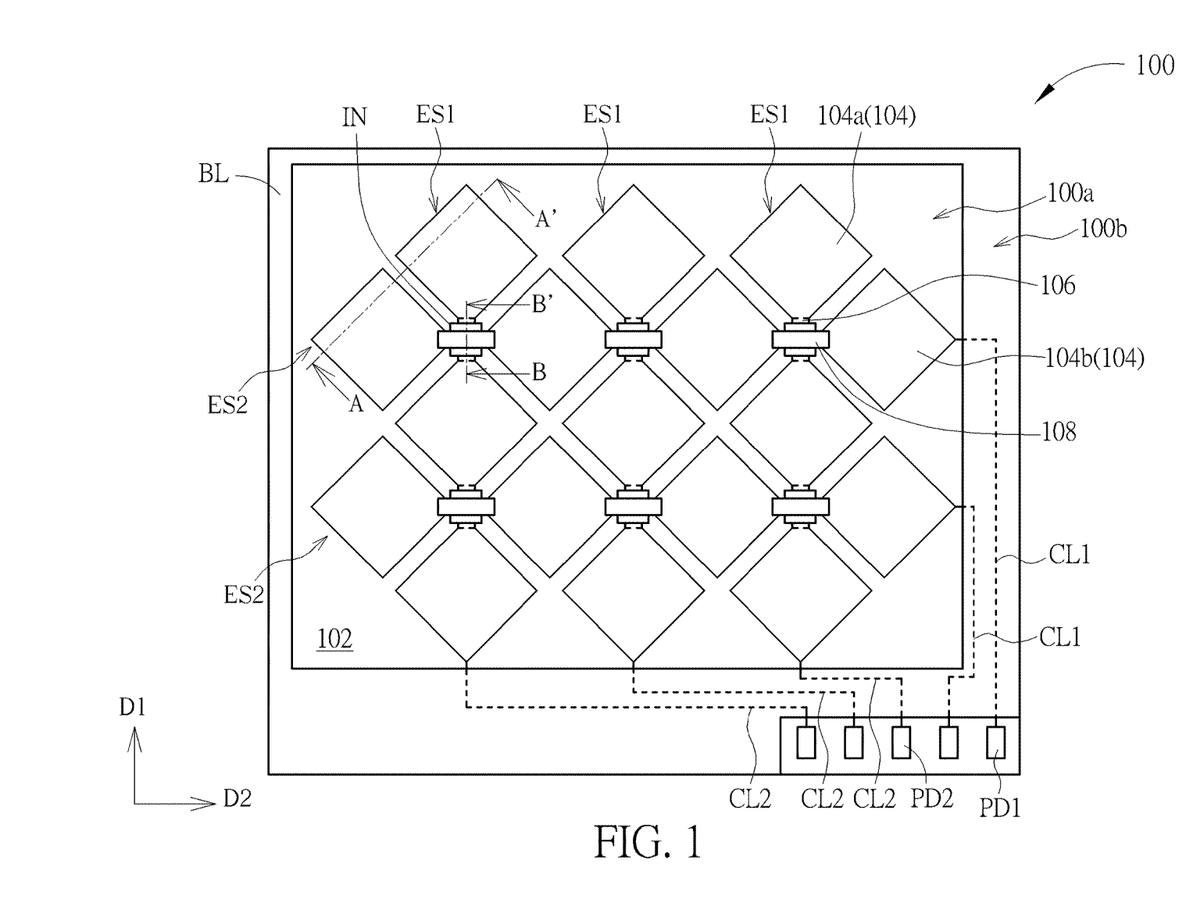
FIG. 1 is a schematic diagram illustrating a top view of a touch panel according to a first embodiment of the present invention.
Figure 2:
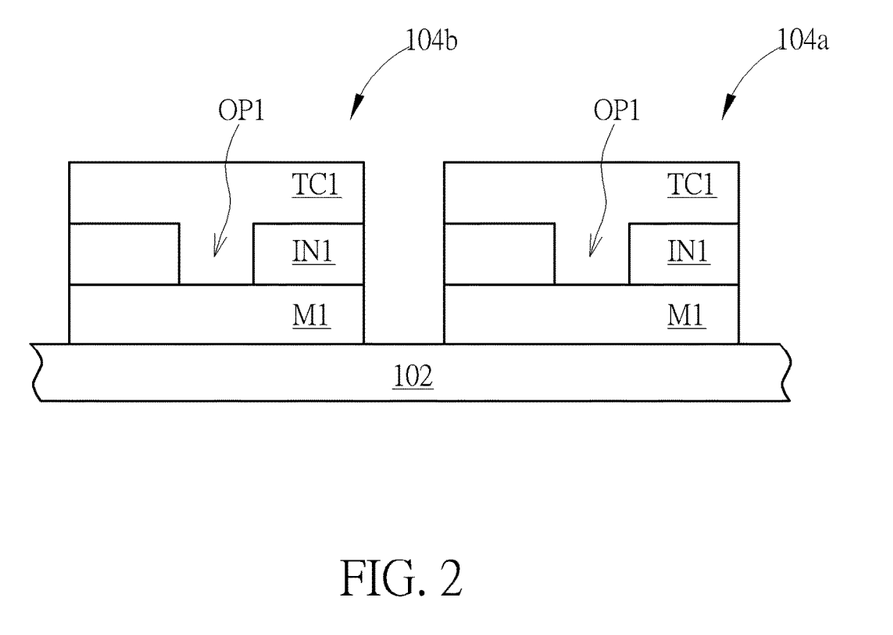
FIG. 2 is a schematic diagram illustrating a cross-sectional view taken along a cross-sectional line A-A' of FIG. 1.
Figure 3:
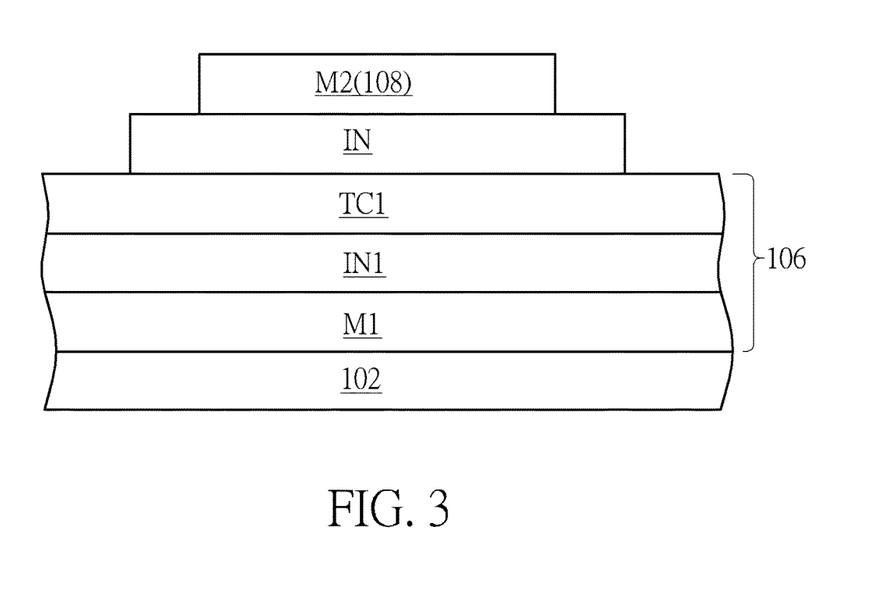
FIG. 3 is a schematic diagram illustrating a cross-sectional view taken along a cross-sectional line B-B' of FIG. 1.

Refer to FIG. 1 to FIG. 3. FIG. 1 is a schematic diagram illustrating a top view of a touch panel according to a first embodiment of the present invention, FIG. 2 is a schematic diagram illustrating a cross-sectional view taken along a cross-sectional line A-A' of FIG. 1, and FIG. 3 is a schematic diagram illustrating a cross-sectional view taken along a cross-sectional line B-B' of FIG. 1. The touch panel 100 provided in this embodiment includes a substrate 102, and a plurality of sensing electrodes 104 disposed on the substrate 102. The substrate 102 may be a hard substrate, such as including glass, or a flexible substrate including a flexible material, such as polyimide (PI), polyethylene terephthalate (PET), cycloolefin copolymer (COC) or polycarbonate (PC). A radius of curvature of the substrate 102 while being bent or rolled may range from 1 mm to 10 mm (R1~R10), preferably from 1 mm to 5 mm (R1~R5), but the present invention is not limited thereto. When the substrate 102 is a flexible substrate, the sensing electrodes 104 may also have flexibility, so the touch panel 100 can be a flexible touch panel, but the present invention is not limited herein.

Figure 4:
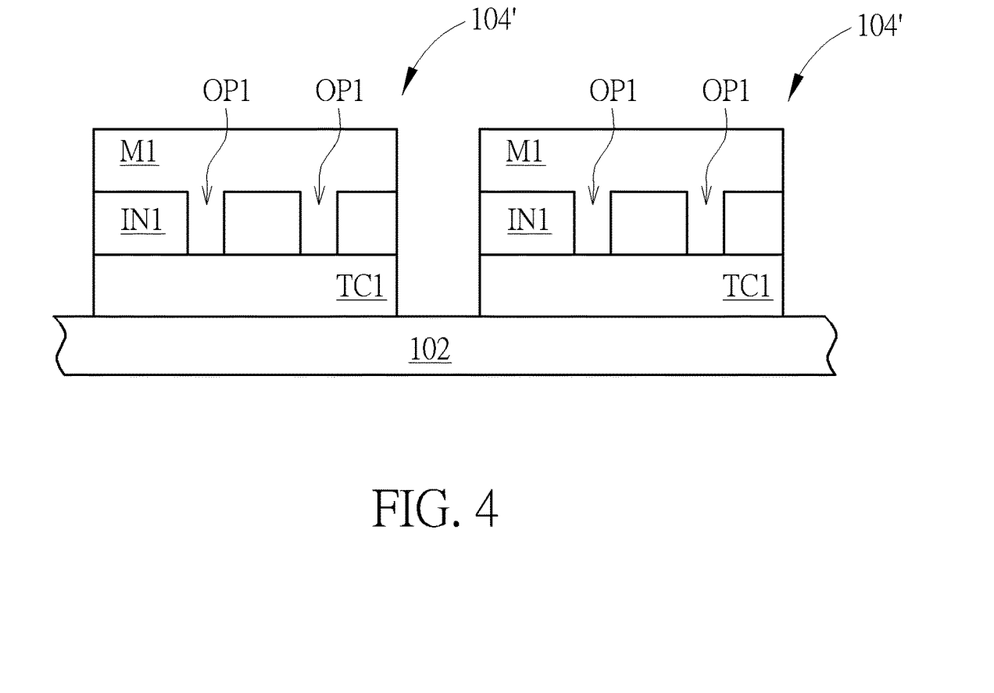
FIG. 4 is a schematic diagram illustrating a cross-sectional view of a touch panel according to another variant embodiment of the first embodiment of the present invention.

In this embodiment, the touch panel 100 may have a transparent region 100a and an opaque region 100b. For instance, the touch panel 100 may further include a light-shielding layer BL disposed on the substrate 102. The light-shielding layer BL may be used to define the opaque region 100b, so as to shield light from penetration, and a part of the touch panel 100 without disposing the light-shielding layer BL is defined as the transparent region 100a, so as to allow light penetrating. The light-shielding layer BL may surround the transparent region 100a. Each sensing electrode 104 may be disposed on the substrate 102 in the transparent region 100a and be used for detecting a signal difference when a touch object touches the touch panel 100. Each sensing electrode 104 may be a multilayer structure respectively, and the sensing electrodes 104 are spaced apart from each other. In present embodiment, each sensing electrode 104 may include a first metal layer M1, a first insulation layer IN1, and a first transparent conductive layer TC1 stacked on the substrate 102 sequentially. In other words, the first insulation layer IN1 is sandwiched in between the first metal layer M1 and the first transparent conductive layer TC1 to form a sandwich structure. Since each sensing electrode 104 is formed by patterning a stack film formed of the first metal layer M1, the first insulation layer IN1 and the first transparent conductive layer TC1, a periphery outline of the first metal layer M1, a periphery outline of the first insulation layer IN1 and a periphery outline of the first transparent conductive layer TC1 of each sensing electrode 104 may be the same. Namely, an edge of the first metal layer M1, an edge of the first insulation layer IN1 and an edge of the first transparent conductive layer TC1 are aligned to each other, which means the size and the shape of the first metal layer M1, the size and the shape of the first insulation layer IN1 and the size and the shape of the first transparent conductive layer TC1 are respectively the same. Furthermore, in each sensing electrode 104, the first metal layer M1 may be in contact with the first transparent conductive layer TC1, so that they can be electrically connected to each other. Accordingly, resistance of each sensing electrode 104 may be reduced through the first metal layer M1. In this embodiment, the first insulation layer IN1 may include at least one through hole OP1, and the first transparent conductive layer TC1 may be electrically in contact with the first metal layer M1 through the through hole OP1. Also, the first metal layer M1 may be disposed between the first transparent conductive layer TC1 and the substrate 102, but not limited thereto. In a variant embodiment, as shown in FIG. 4, the first transparent conductive layer TC1 may be disposed between the first metal layer M1 and the substrate 102. Furthermore, the first insulation layer IN1 of each sensing electrode 104' may include a plurality of through holes OP1, but not limited herein.

It is noted that the first insulation layer IN1 of this embodiment may have tensile stress through adjusting process parameter, for example adjusting ratios of introduced gases. Because the first transparent conductive layer TC1 and the first metal layer M1 have compressive stress, the first insulation layer IN1 with the tensile stress can mitigate the compressive stresses of the first transparent conductive layer TC1 and the first metal layer M1. Accordingly, the first transparent conductive layer TC1 and the first metal layer M1 can be affected by the tensile stress of the first insulation layer IN1 while being bent, so as not to be broken, thereby improving total bending ability of each sensing electrode 104. Hence, when the touch panel 100 is bent, the first transparent conductive layer TC1 and the first metal layer M1 are not easily cracked, thereby improving the bending ability of the touch panel 100. For example, through the disposition of the first insulation layer IN1, the touch panel 100 may have a foldable function. In this embodiment, the first transparent conductive layer TC1 may include for example ITO, indium zinc oxide (IZO), antimony tin oxide (ATO), antimony zinc oxide (AZO), but not limited thereto. The first metal layer M1 may include for example silver, copper, aluminum, molybdenum or silver alloy, but not limited thereto. The first insulation layer IN1 may include for example silicon nitride or silicon oxide, but not limited thereto.

Furthermore, the touch panel 100 of this embodiment may further include a plurality of first connecting segments 106, a plurality of second connecting segments, and an insulation layer IN. The sensing electrodes 104 may include a plurality of first sensing electrodes 104a and a plurality of second sensing electrodes 104b. Each first connecting segment 106 is connected to two of the first sensing electrodes 104a near each other and arranged along a first direction D1, so that the first sensing electrodes 104a and the first connecting segments 106 arranged in the first direction D1 can be serially and electrically connected to be a first electrode series ES1. Each second connecting segment 108 is connected to two of the second sensing electrodes 104b near each other and arranged along a second direction D2, so that the second sensing electrodes 104b and the second connecting segments arranged in the second direction D2 can be serially and electrically connected to be a second electrode series ES2. Each first connecting segment 106 crosses a corresponding one of the second connecting segments respectively, and they are insulated by the insulation layer IN. Accordingly, each first electrode series ES1 can cross and be insulated from each second electrode series ES2. In this embodiment, each first connecting segment 106 may include the first metal layer M1, the first insulation layer IN1, and the first transparent conductive layer TC1. In another word, each first connecting segment 106 may be formed simultaneously with the sensing electrodes 104, but the present invention is not limited thereto. Besides, each second connecting segment 108 may include a second metal layer M2 disposed on the insulation layer IN and extending to contact two of the second sensing electrodes 104b near each other so as to electrically connect the two second sensing electrodes 104b. Since each second connecting segment 108 crosses over the first electrode series ES1, the touch panel 100 of this embodiment can be a top bridge type. In another variant embodiment, the touch panel may be a bottom bridge type, which means the second metal layer M2 of each second connecting segment 108 may be disposed under the first electrode series ES1 and between the first electrode series ES1 and the substrate 102. The insulation layer IN is also disposed under the first electrode series ES1. In this embodiment, the second metal layer M2 may include for example silver or silver alloy, but not limited thereto. The insulation layer IN may include for example silicon nitride or silicon oxide, but not limited thereto. In another variant embodiment, the second metal layer M2 of each second connecting segment 108 may be replaced by a second transparent conductive layer.

Figure 5:
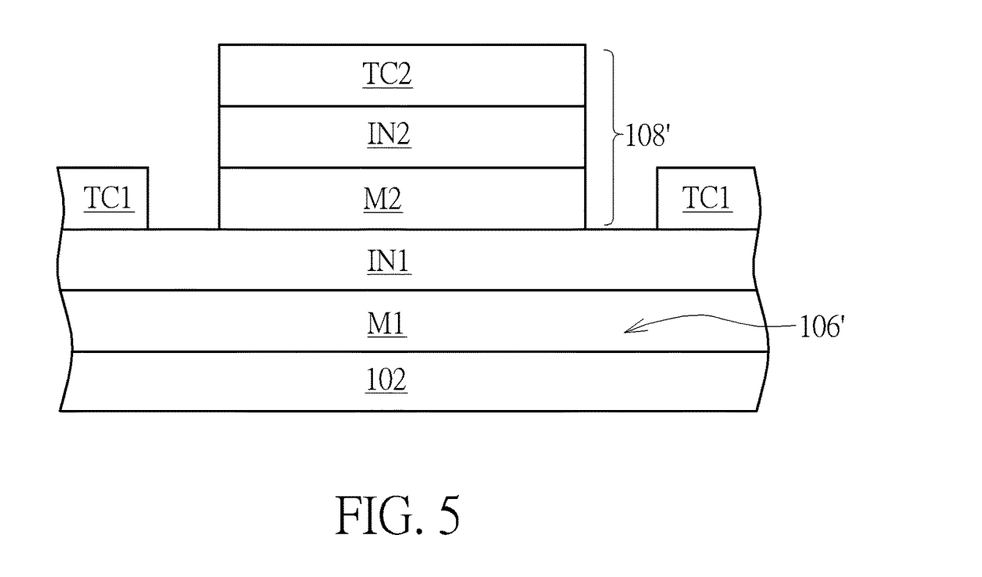
FIG. 5 is a schematic diagram illustrating a cross-sectional view of a touch panel according to another variant embodiment of the first embodiment of the present invention.

In another variant embodiment, as shown in FIG. 5, the first insulation layer IN1 may be used to electrically isolate one of the first connecting segments 106' and the corresponding second connecting segment 108' crossing each other. Specifically, each first connecting segment 106' may include the first metal layer M1, and doesn't include the first transparent conductive layer TC1. Also, the first insulation layer IN1 may cover the first metal layer M1 of the first connecting segments 106. Furthermore, each second connecting segment 108 may include a second metal layer M2 and a second transparent conductive layer TC2 and further include a second insulation layer IN2 having tensile stress disposed between the second metal layer M2 and the second transparent conductive layer TC2, so as to improve the bending ability of the second connecting segments 108. The second metal layer M2 may be disposed between the second insulation layer IN2 and the first insulation layer IN1. The second transparent conductive layer TC2 may include for example ITO, IZO, ATO or AZO, but not limited thereto. The second insulation layer IN2 may include for example silicon nitride or silicon oxide, but not limited thereto. In another variant embodiment, each first connecting segment 106' may only include the first transparent conductive layer TC1 disposed between the first insulation layer IN1 and the substrate 102 and doesn't include the first metal layer M1. In another variant embodiment, each second connecting segment 108' may only include the second metal layer M2 or the second transparent conductive layer TC2.

In this embodiment, the touch panel 100 may include a plurality of conducting wires disposed on the substrate 102 in the opaque region 100b, and each conducting wire is electrically connected to the sensing electrodes 104 corresponding thereto respectively. Specifically, the conducting wires may include a plurality of first conducting wires CL1 and a plurality of second conducting wires CL2. Each first conducting wire CL1 is used to electrically connect each first electrode series ES1 to a corresponding pad PD1 in the opaque region 100b respectively, and each second conducting wire CL2 is used to electrically connect each second electrode series ES2 to a corresponding pad PD2 in the opaque region 100b respectively, so that the first electrode series ES1 and the second electrode series ES2 can be connected to a control device respectively. Each conducting wire may include metal, transparent conductive materials or a stack thereof. For instance, each conducting wire may include the first metal layer M1, the first transparent conductive layer TC1 or a stack of the first metal layer M1, the first insulation layer IN1 and the first transparent conductive layer TC1, but not limited thereto. When each conducting wire includes the stack of the first metal layer M1, the first insulation layer IN1 and the first transparent conductive layer TC1, the first insulation layer IN1 of each conducting wire may selectively have at least another through hole to allow the first metal layer M1 being electrically connected to the first transparent conductive layer TC1 through this through hole. Additionally, a photomask for forming the conducting wires may be integrated into a photomask for forming the sensing electrodes 104, so the photomask for forming the conducting wires may be saved.

As the above-mentioned description, because the bending ability of the stack of the first transparent conductive layer TC1, the first insulation layer IN1 and the first metal layer M1 can be improved by disposing the first insulation layer IN1 with tensile stress between the first transparent conductive layer TC1 and the first metal layer M1, the sensing electrodes 104, the connecting segments and/or the conducting wires utilizing the stack with the first insulation layer IN1 can help to improve the bending reliability of the touch panel 100 and prolong lifetime of the touch panel 100.

The touch panel of the present invention is not limited to the above-mentioned embodiment. The following description continues to detail the other embodiments or variant embodiments, and in order to simplify and show the difference between the other embodiments or variant embodiments and the above-mentioned embodiment, the same numerals denote the same components in the following description, and the same parts are not detailed redundantly.

Figure 6:
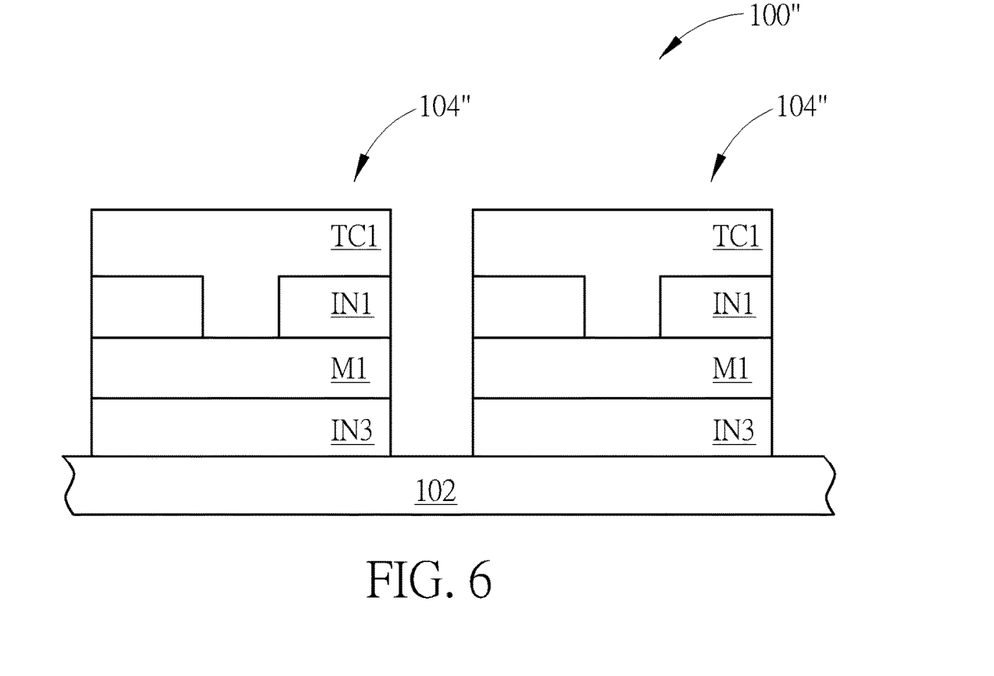
FIG. 6 is a schematic diagram illustrating a cross-sectional view of a touch panel according to another variant embodiment of the first embodiment of the present invention.

Refer to FIG. 6, which is a schematic diagram illustrating a cross-sectional view of a touch panel according to another variant embodiment of the first embodiment of the present invention. The stack of each sensing electrode 104" of this variant embodiment is different from that of the first embodiment. The difference between the touch panel 100" of this variant embodiment and the first embodiment is that each sensing electrode 104" may further include a third insulation layer IN3 disposed between the sensing electrodes 104" and the substrate 102. The third insulation layer IN3 has tensile stress, especially to the first metal layer M1 and the first transparent conductive layer TC1. The third insulation layer IN3 may have pattern structures, and each of which has the same size and the same shape as the first metal layer M1, the first insulation layer IN1 and the first transparent conductive layer TC1 in each sensing electrode 104", but not limited thereto. The third insulation layer IN3 may include for example silicon nitride or silicon oxide, but not limited thereto. In another variant embodiment, the third insulation layer IN3 may further cover a whole top surface (not shown in the figure) of the substrate 102. In another variant embodiment, the third insulation layer IN3 may be disposed on and cover the sensing electrodes 104". Or, the touch panel 100" further includes another insulation layer disposed on and covering the sensing electrodes 104".

Figure 7:
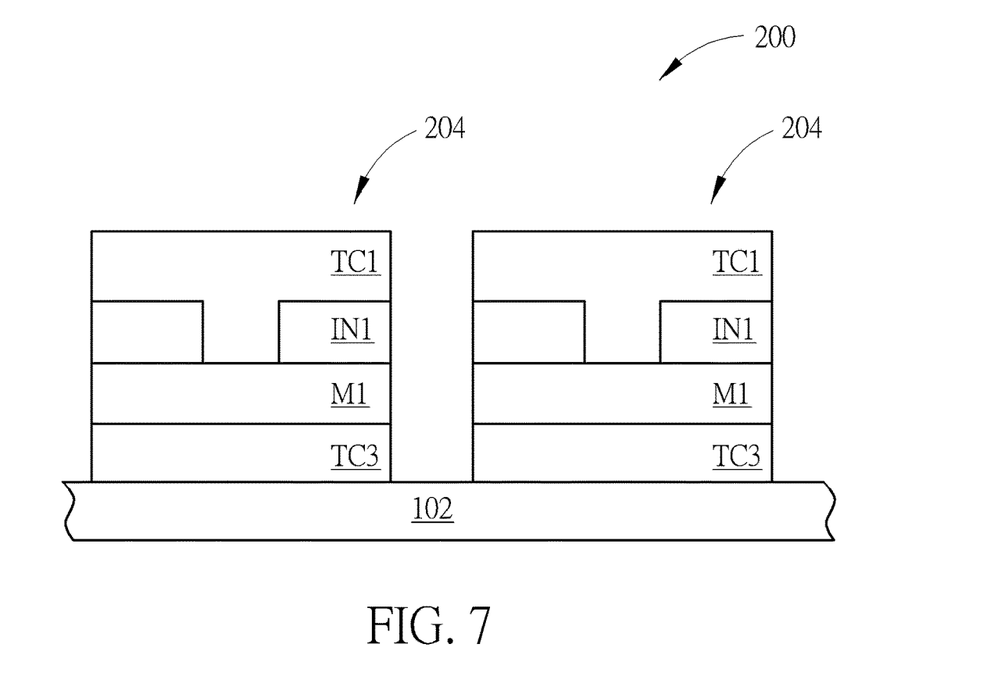
FIG. 7 is a schematic diagram illustrating a cross-sectional view of a touch panel according to a second embodiment of the present invention.
Figure 8:
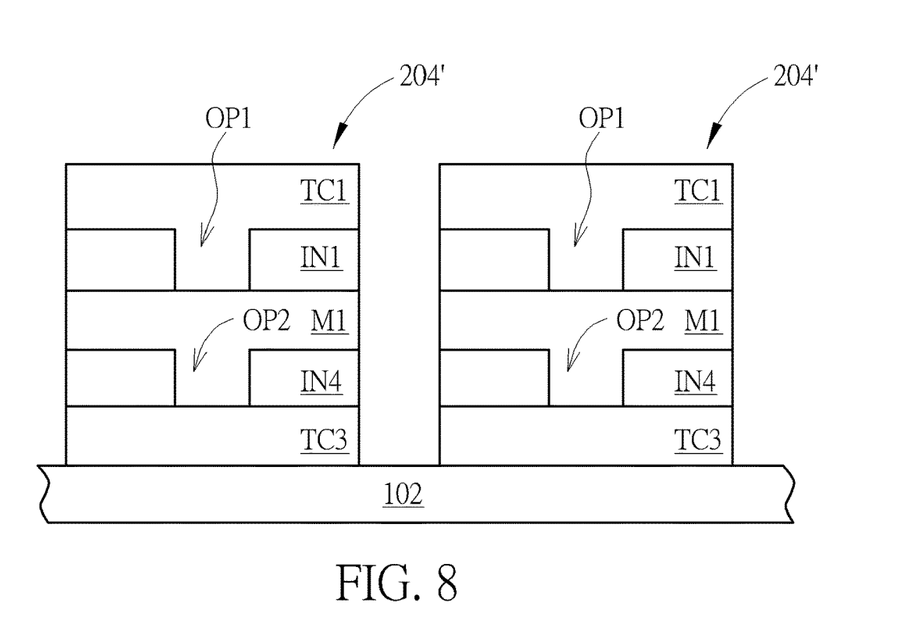
FIG. 8 is a schematic diagram illustrating a cross-sectional view of a touch panel according to another variant embodiment of the second embodiment of the present invention.
Figure 9:
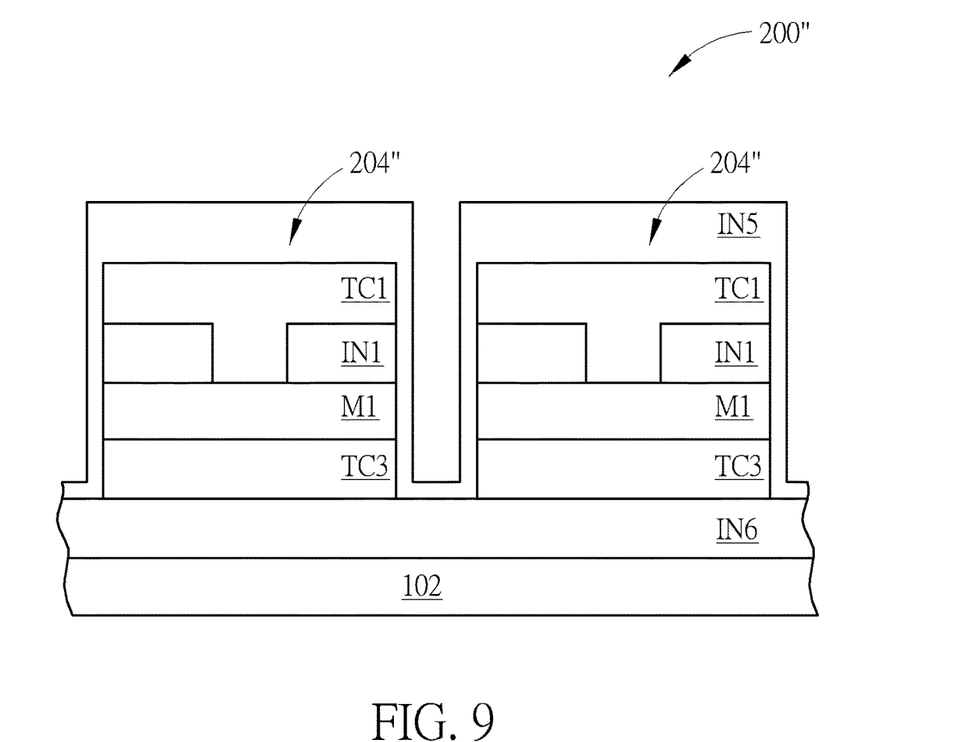
FIG. 9 is a schematic diagram illustrating a cross-sectional view of a touch panel according to another variant embodiment of the second embodiment of the present invention.

Refer to FIG. 7, which is a schematic diagram illustrating a cross-sectional view of a touch panel according to a second embodiment of the present invention. The difference between the touch panel 200 of this embodiment and the first embodiment is that each sensing electrode 204 may further include a third transparent conductive layer TC3, and the first metal layer M1 is disposed between the first transparent conductive layer TC1 and the third transparent conductive layer TC3. Specifically, the third transparent conductive layer TC3 is disposed between the first insulation layer IN1 and the substrate 102, and the top surface of the third transparent conductive layer TC3 is in contact with the first metal layer M1. Similarly, the first metal layer M1, the first insulation layer IN1, the first metal layer M1 and the third transparent conductive layer TC3 may have the same size and the same shape, so as to have the same pattern (ex. the diamond shape). The third transparent conductive layer TC3 may include for example ITO, IZO, ATO or AZO, but not limited thereto. In a variant embodiment, as shown in FIG. 8, each sensing electrode 204' may further include a fourth insulation layer IN4 disposed between the first metal layer M1 and the third transparent conductive layer TC3, and the fourth insulation layer IN4 has tensile stress. The fourth insulation layer IN4 may include for example silicon nitride or silicon oxide, but not limited thereto. In this variant embodiment, the fourth insulation layer IN4 may have at least one through hole OP2, such that the first metal layer M1 can be electrically connected to the third transparent conductive layer TC3 through the through hole OP2. In another variant embodiment, as shown in FIG. 9, the touch panel 200" may further include a fifth insulation layer IN5 and a sixth insulation layer IN6, in which the fifth insulation layer IN5 covers each sensing electrode 204" and extends onto the substrate 102, and the sixth insulation layer IN6 is disposed between each sensing electrode 204" and the substrate 102. Also, at least one of the fifth insulation layer IN5 and the sixth insulation layer IN6 may have tensile stress. The fifth insulation layer IN5 and the sixth insulation layer IN6 may include for example silicon nitride or silicon oxide respectively, but not limited thereto. Besides, the fifth insulation layer IN5 and the sixth insulation layer IN6 may be for example optical compensation layers respectively, such that light penetrating parts of the touch panel 200" with the sensing electrodes 204" and penetrating parts of the touch panel 200" without the sensing electrodes 204" may be uniformed to reduce visibility of the sensing electrodes 204". In another embodiment, at least one of the fifth insulation layer IN5 and the sixth insulation layer IN6 may have the same pattern as the sensing electrodes 204".

Figure 10:
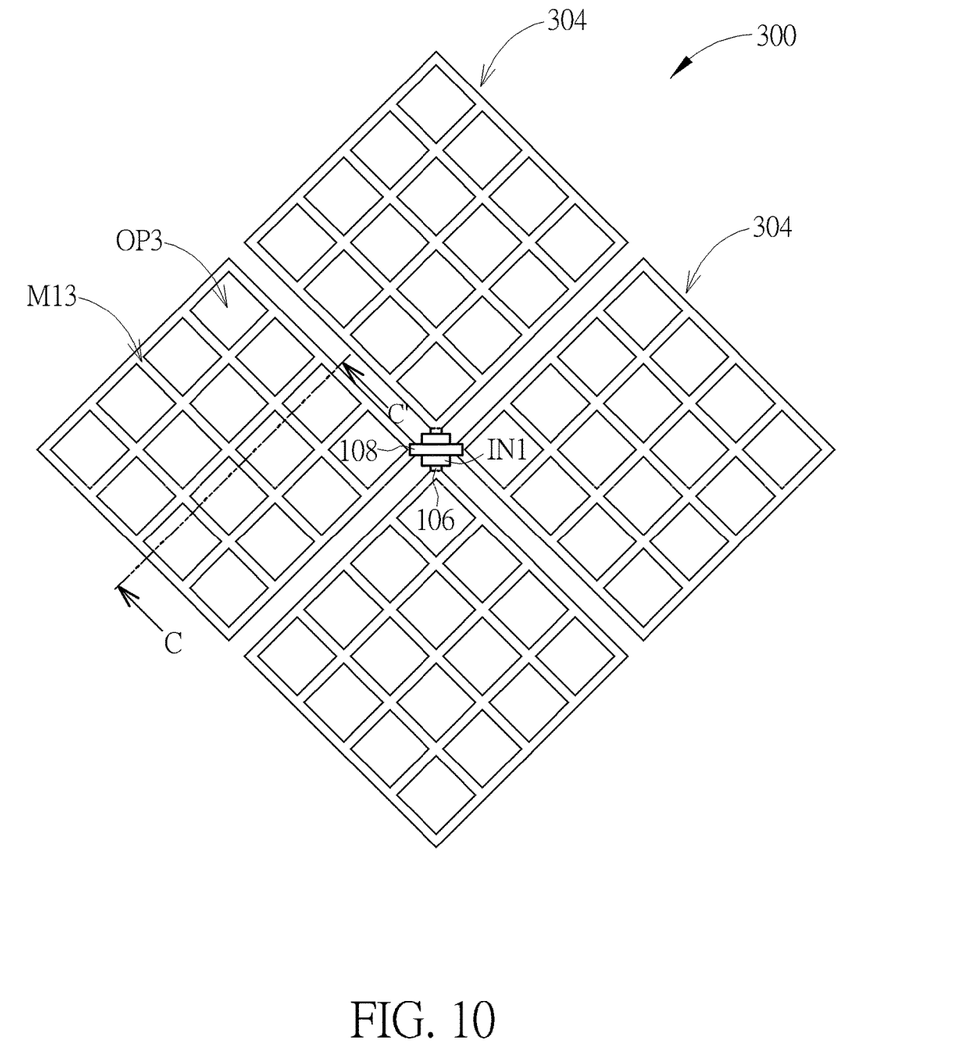
FIG. 10 is a schematic diagram illustrating a top view of a touch panel according to a third embodiment of the present invention.
Figure 11:
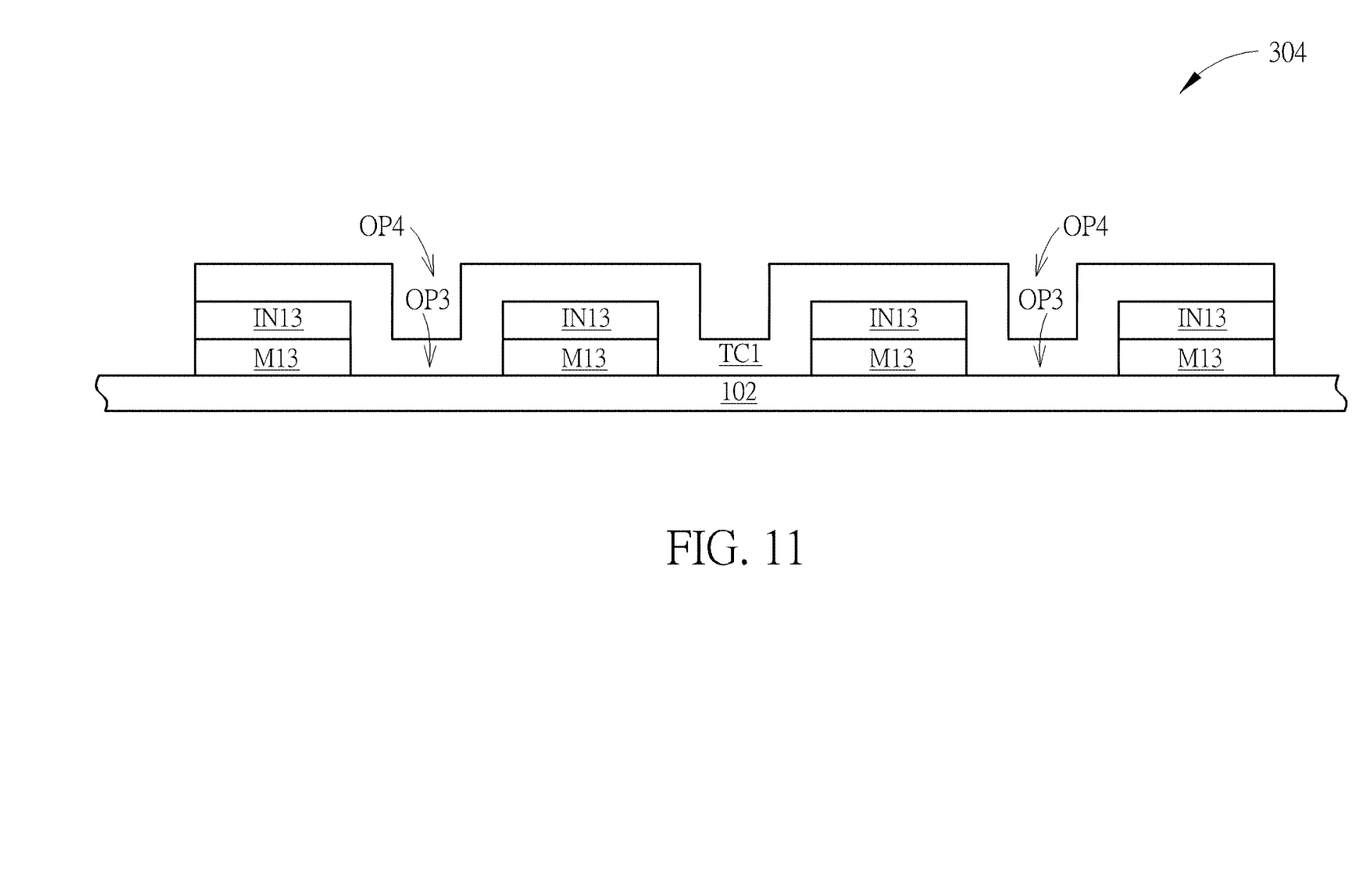
FIG. 11 is across-sectional view taken along a cross-sectional line C-C' of FIG. 10.

Refer to FIG. 10 and FIG. 11. FIG. 10 is a schematic diagram illustrating a top view of a touch panel according to a third embodiment of the present invention, and FIG. 11 is a cross-sectional view taken along a cross-sectional line C-C' of FIG. 10. For clearly illustrating each sensing electrode, FIG. 10 only shows single sensing electrode, but the present invention is not limited thereto. The difference between the touch panel 300 of this embodiment and the first embodiment is that the first metal layer M13 of each sensing electrode 304 may has a first mesh structure that has a plurality of first through holes OP3 exposing the substrate 102 respectively. Specifically, the first insulation layer IN13 may also include a second mesh structure that has a plurality of second through holes OP4 corresponding to one of the first through holes OP3 respectively. The first transparent conductive layer TC1 covers the first insulation layer IN13 and extends into each first through hole OP3 and each second through hole OP4, such that the first transparent conductive layer TC1 can be electrically in contact with the first metal layer M13 through at least one second through hole OP4 of the second mesh structure and also in contact with the substrate 102.

Figure 12:
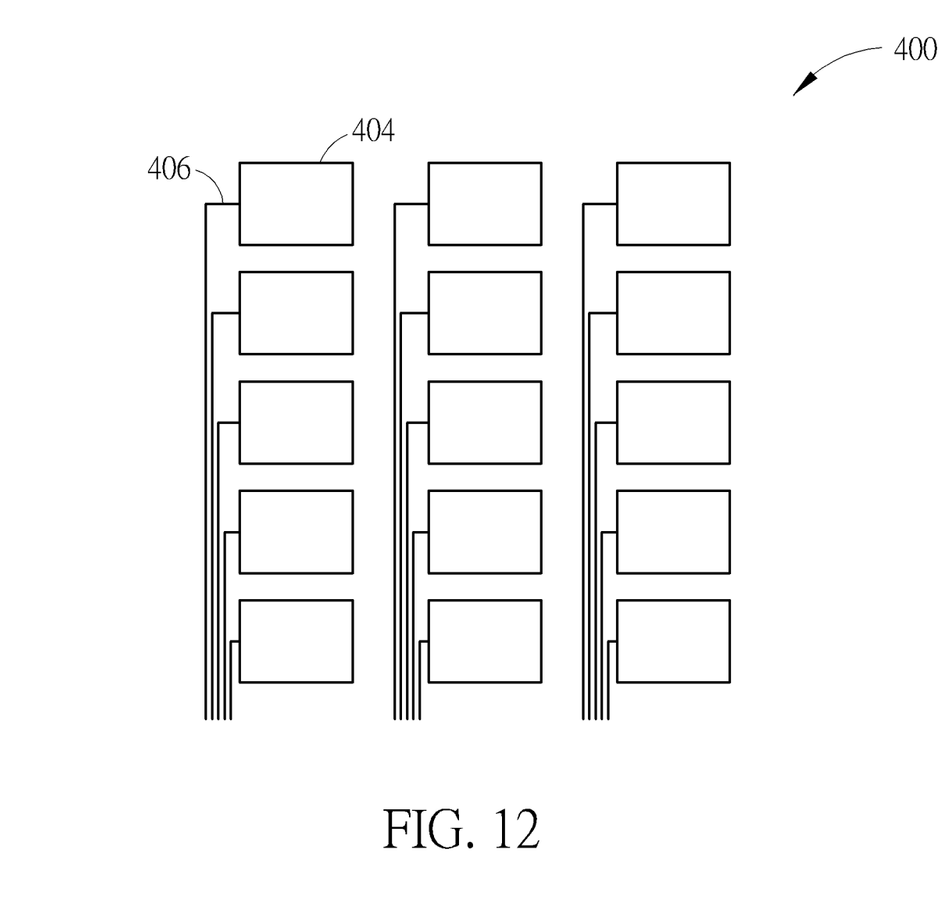
FIG. 12 is a schematic diagram illustrating a top view of a touch panel according to a fourth embodiment of the present invention.

Refer to FIG. 12, which is a schematic diagram illustrating a top view of a touch panel according to a fourth embodiment of the present invention. The difference between the touch panel 400 of this embodiment and the first embodiment is that the touch panel 400 has a single layer touch sensing structure. Specifically, each sensing electrode 404 may be connected to one corresponding conducting wire 406 respectively, so as to be electrically connected to pad independently. The conducting wires 406 do not cross each other. Each sensing electrode 404 and each conducting wire 406 may utilize the stack in the above-mentioned first embodiment, the second embodiment or other variant embodiments, and will not be detailed redundantly.

Figure 13:
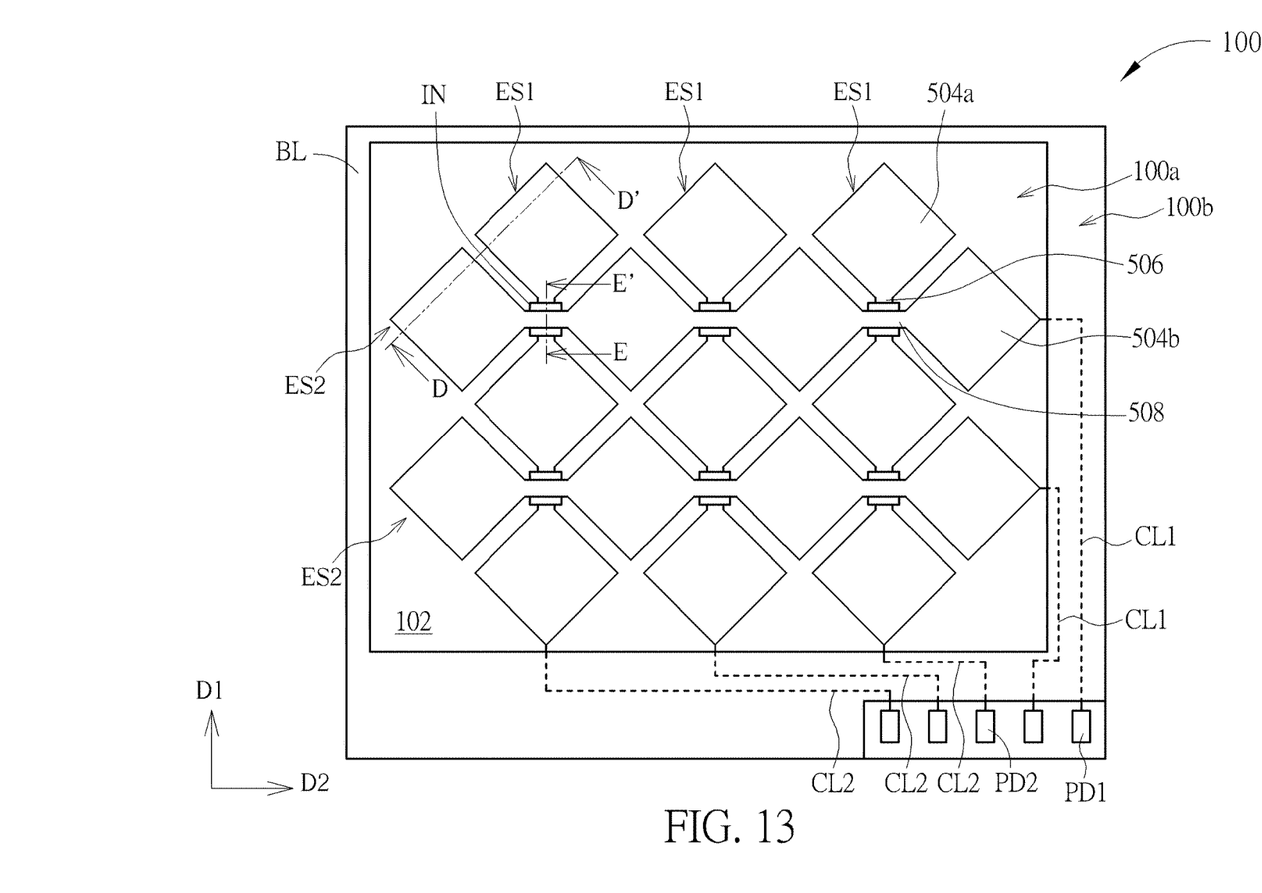
FIG. 13 is a schematic diagram illustrating a top view of a touch panel according to a fifth embodiment of the present invention.
Figure 14:
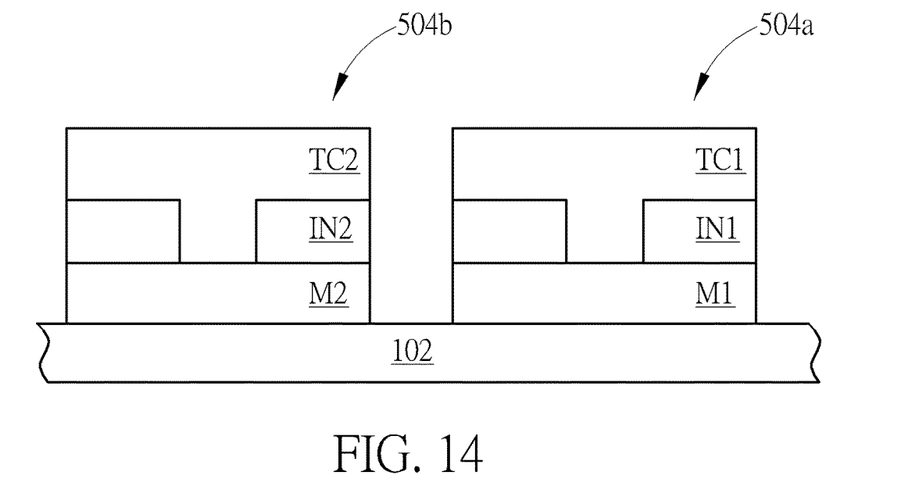
FIG. 14 is a cross-sectional view taken along a cross-sectional line D-D' of FIG. 13.
Figure 15:
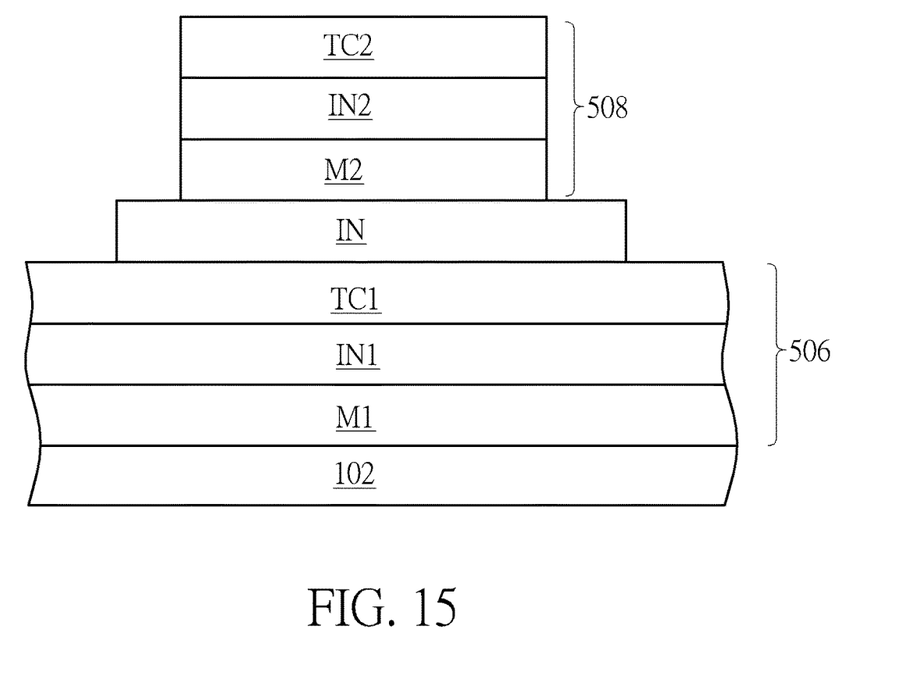
FIG. 15 is a cross-sectional view taken along a cross-sectional line E-E' of FIG. 13.

Refer to FIG. 13 to FIG. 15. FIG. 13 is a schematic diagram illustrating a top view of a touch panel according to a fifth embodiment of the present invention, FIG. 14 is a cross-sectional view taken along a cross-sectional line D-D' of FIG. 13, and FIG. 15 is a cross-sectional view taken along a cross-sectional line E-E' of FIG. 13. As shown in FIG. 13 to FIG. 15, the difference between the touch panel of this embodiment and the first embodiment is that the second sensing electrodes 504b and the second connecting segments 508 are formed of the same layers. Specifically, each second sensing electrode 504b and each second connecting segment 508 may include the second metal layer M2, the second insulation layer IN2 and the second transparent conductive layer TC2 stacked on the substrate 102 in sequence. Also, each second connecting segment 508 and the corresponding first connecting segment 506 have the insulation layer IN disposed therebetween, so that the second metal layer M2, the second insulation layer IN2 and the second transparent conductive layer TC2 of each second connecting segment 508 are disposed on the insulation layer IN in order. Besides, each first sensing electrode 504a and each first connecting segment 506 may include the first metal layer M1, the first insulation layer IN1 and the first transparent conductive layer TC1. In another embodiment, positions of the second metal layer M2 and the second transparent conductive layer TC2 may be exchanged.

In another embodiment, the stack of the first transparent conductive layer TC1, the first insulation layer IN1 and the first metal layer M1 may be applied to a peripheral circuit (such as CL1 and CL2) of a liquid crystal display device so as to improve circuit broken problem while the peripheral circuit is bent.

In summary, in the touch panel of the present invention, because the bending ability of the stack of the first transparent conductive layer, the first insulation layer and the first metal layer can be improved by disposing the first insulation layer with tensile stress between the first transparent conductive layer and the first metal layer, the bending ability of the sensing electrodes, the connecting segments and/or the conducting wires utilizing the stack can be increased, thereby improving the bending reliability of the touch panel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch panel, having a transparent region and an opaque region, and the touch panel comprising:
    a substrate;
    a light-shielding layer disposed on the substrate in the opaque region;
    a plurality of first sensing electrodes disposed on the substrate in the transparent region, and each first sensing electrode comprising a first metal layer, a first insulation layer, and a first transparent conductive layer, wherein in each first sensing electrode, the first insulation layer is disposed between the first metal layer and the first transparent conductive layer, and the first metal layer and the first transparent conductive layer are electrically connected to each other; and
    a plurality of conducting wires disposed on the substrate in the opaque region, and each conducting wire being electrically connected to the first sensing electrodes corresponding thereto respectively,
    wherein the first insulation layer of each first sensing electrode comprises at least one through hole, and in each first sensing electrode, the first transparent conductive layer is in contact with the first metal layer through the at least one through hole.

2. The touch panel according to claim 1, wherein the first metal layer of each first sensing electrode comprises a first mesh structure having a plurality of first through holes, the first insulation layer of each first sensing electrode comprises a second mesh structure having a plurality of second through holes corresponding to one of the first through holes of the first mesh structure respectively, and in each first sensing electrode, the first transparent conductive layer is in contact with the first metal layer through at least one of the second through holes and a corresponding one of the first through holes.

3. The touch panel according to claim 1, wherein the first insulation layer comprises silicon nitride or silicon oxide.

4. The touch panel according to claim 1, further comprising a plurality of second sensing electrodes, a plurality of first connecting segments, and a plurality of second connecting segments, wherein each first connecting segment crosses a corresponding one of the second connecting segments respectively, each first connecting segment is connected to two of the first sensing electrodes near each other and arranged along a first direction respectively, and each second connecting segment is connected to two of the second sensing electrodes near each other and arranged along a second direction respectively.

5. The touch panel according to claim 4, wherein each second sensing electrode comprises the first metal layer, the first insulation layer and the first transparent conductive layer.

6. The touch panel according to claim 5, wherein each first connecting segment comprises the first metal layer.

7. The touch panel according to claim 6, wherein each first connecting segment further comprises the first insulation layer and the first transparent conductive layer.

8. The touch panel according to claim 5, wherein each second connecting segment comprises at least one of a second metal layer or a second transparent conductive layer.

9. The touch panel according to claim 8, wherein each second connecting segment further comprises a second insulation layer.

10. The touch panel according to claim 4, wherein each first connecting segment comprises the first metal layer, the first insulation layer, and the first transparent conductive layer, and each second sensing electrode and each second connecting segment comprises a second metal layer, a second insulation layer, and a second transparent conductive layer.

11. The touch panel according to claim 1, wherein the first metal layer is disposed between the first transparent conductive layer and the substrate.

12. The touch panel according to claim 1, wherein the first transparent conductive layer is disposed between the first metal layer and the substrate.

13. The touch panel according to claim 1, wherein each first sensing electrode further comprises a third insulation layer disposed between the first metal layer and the substrate, and the third insulation layer has tensile stress.

14. The touch panel according to claim 1, wherein each first sensing electrode further comprises a third transparent conductive layer, and the first metal layer is disposed between the first transparent conductive layer and the third transparent conductive layer.

15. The touch panel according to claim 14, wherein the third transparent conductive layer is disposed between the first metal layer and the substrate.

16. The touch panel according to claim 14, wherein the first transparent conductive layer is disposed between the first metal layer and the substrate.

17. The touch panel according to claim 14, wherein each first sensing electrode further comprises a fourth insulation layer disposed between the first meal layer and the third transparent conductive layer, and the fourth insulation layer has tensile stress.

* * * * *